May 8, 1956  J. W. GRAY  2,744,683
NAVIGATIONAL RESOLVER-INTEGRATOR
Filed Dec. 16, 1949  6 Sheets-Sheet 2

Inventor
JOHN W. GRAY
By
H. J. Mackey
Attorney

May 8, 1956  J. W. GRAY  2,744,683
NAVIGATIONAL RESOLVER-INTEGRATOR
Filed Dec. 16, 1949  6 Sheets-Sheet 3

Inventor
JOHN W. GRAY
By H. L. Mackey
Attorney

May 8, 1956 J. W. GRAY 2,744,683
NAVIGATIONAL RESOLVER-INTEGRATOR
Filed Dec. 16, 1949 6 Sheets-Sheet 4

Inventor
JOHN W. GRAY
By
H. S. Mackey
Attorney

Inventor
JOHN W. GRAY

May 8, 1956                J. W. GRAY                2,744,683
                    NAVIGATIONAL RESOLVER-INTEGRATOR
Filed Dec. 16, 1949                              6 Sheets-Sheet 6
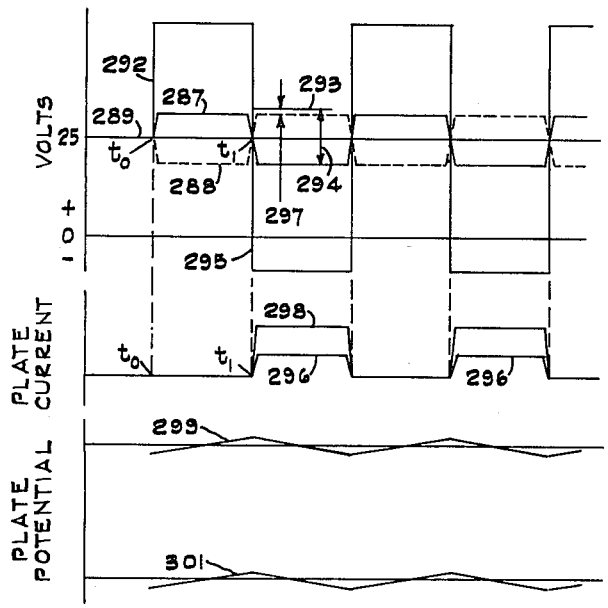
Fig. 8
Fig. 9
Fig. 10
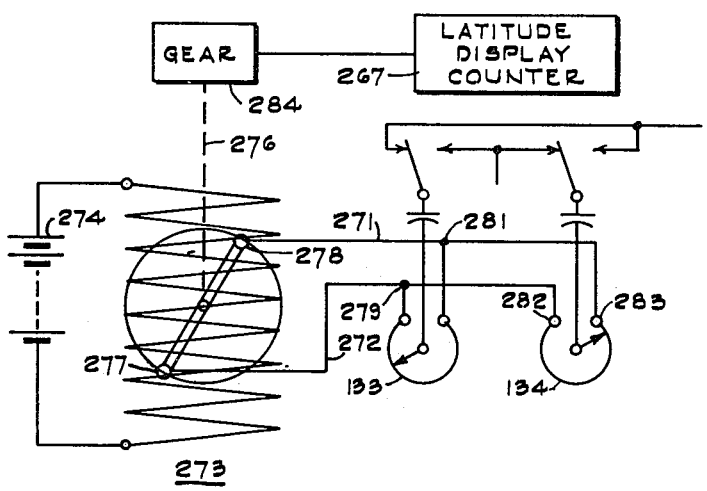
Fig. 11
Inventor
JOHN W. GRAY
By
H. I. Mackey
Attorney

United States Patent Office 2,744,683
Patented May 8, 1956

2,744,683

NAVIGATIONAL RESOLVER-INTEGRATOR

John W. Gray, White Plains, N. Y., assignor to General Precision Laboratory Incorporated, a corporation of New York Application December 16, 1949, Serial No. 133,315

6 Claims. (Cl. 235—61)

This invention pertains to that class of computing devices which performs a series of mathematical operations and particularly to computing devices which multiply, find trigonometric functions and and integrate.

The position of a vehicle on the surface of the earth or the geographical position of an airplane may be computed if its starting location, speed and course are known. By measuring the Doppler shift in echoes of radio microwaves sent from the vehicle toward stationary objects on the earth along the course, and by combining this information with data on drift and compass heading, the ground speed and true ground course may be found, and from these combined with the latitude and longitude of the starting position may be computed by integration over the elapsed time, the total miles traveled and the present latitude and longitude of the craft.

The purpose of the instant invention is to combine the above information, to compute present position automatically and continuously from such information, and to continuously display on suitable indicators the correct latitude and longitude of the present position of the vehicle.

Several systems for ascertaining the speed and drift of a vehicle such as an airplane have been developed. These systems employ the Doppler principle by generating microwave radiations on the vehicle, observing echoes returned from stationary earth objects, and subtracting the frequency of the reflected radiation from that of the generated radiation. The speed of the airplane can be found from the result of this subtraction, and when cognizance is taken of the angle of best reflection, the drift angle can be found.

Among such systems are thus described in the copending applications Serial No. 749,184 of Tull and Gillette, filed on May 20, 1947; and Serial No. 49,926 of Berger and Tull, filed on September 18, 1948.

The true heading of the craft, found from the compass indication, when combined with the ground track speed and drift angle ascertained as described, will give the horizontal velocity which may be in terms of miles per hour and azimuth angle. These are the data used as input to the equipment of the present invention. The data representing horizontal speed along the ground track are in the form of the frequency of an alternating current voltage within the audio frequency range; the data representing azimuth are in the form of the angular position of a shaft. These two data are presented in these forms to the resolver section of the present invention.

The resolver computes the sine or cosine of the angular input data and multiplies it by the frequency input data to produce a very small direct current proportional to the east-west or north-south component of the craft's velocity.

The integrator converts the small direct current generated within the resolver into a proportional shaft angular velocity. By employment of a simple mechanical counter on this shaft the total amount of rotation during any period of time, which is its integrated angular velocity, is secured. In the east-west direction such an integration operates an indicator of present longitude; and in the north-south direction in present latitude. This entails provision for setting both counters at the beginning of a flight or voyage to the latitude and longitude of the starting position.

A better understanding of this invention may be secured from the following detailed description and the attached drawings in which:

Figs. 8, 9 and 10 illustrate graphically the principles of operation of part of the circuit illustrated in Fig. 7.

Fig. 11 is a schematic wiring diagram of the circuit for correcting the longitude counter.

Figure 1:
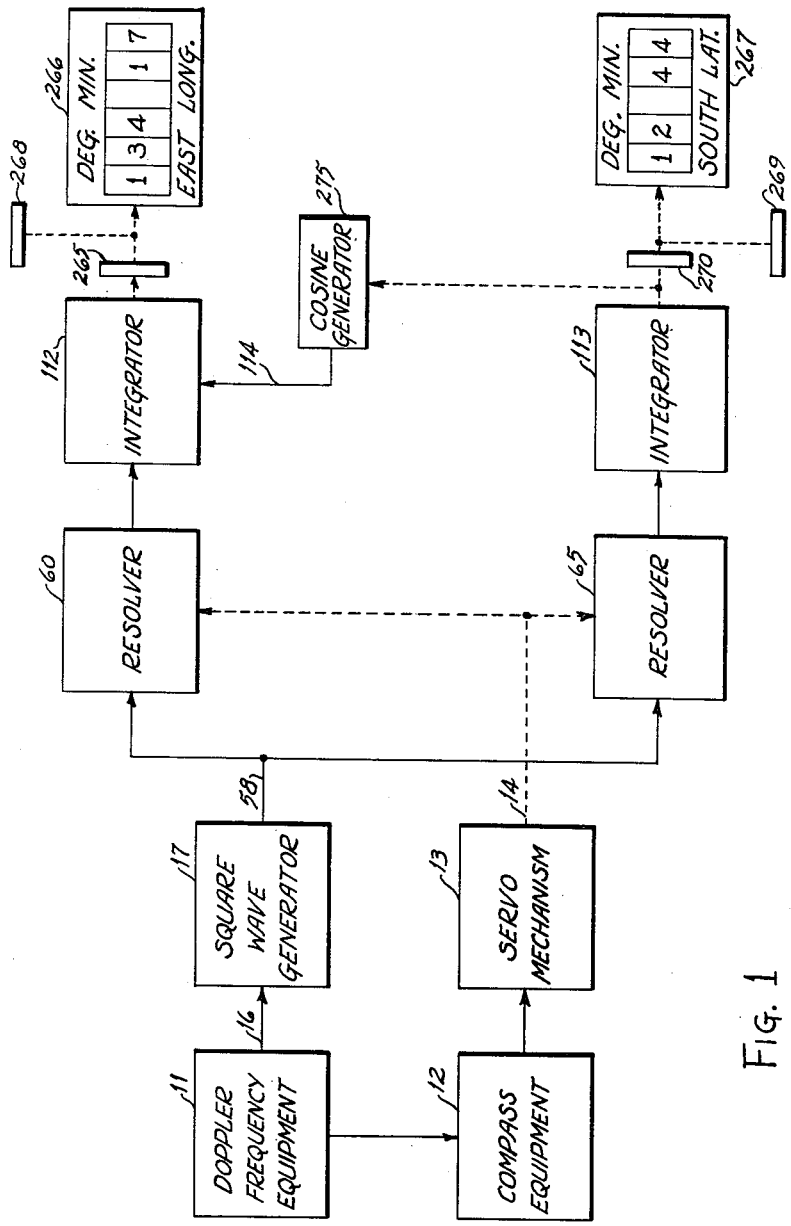
Fig. 1 shows the interrelation of the functional components of the resolver-integrator and associated equipment.

Fig. 1 generally illustrates the equipment required to carry out the purposes of this invention when mounted on an airplane. Microwave equipment for generating electromagnetic radiation and for segregating and amplifying the Doppler shift of its frequency when reflected from the earth's surface is represented by the rectangle 11, such equipment being described in the copending applications supra. The Doppler frequencies may be, for example, in the range between 1000 and 5000 cycles per second and are dependent on the velocity of the radiation, the velocity of the airplane, and the drift angle thereof. A compass indication is combined in compass equipment 12 with the drift angle data received from the Doppler equipment 11 to furnish data representing the true ground course, and after amplification in a servomechanism 13 the course data are embodied in the angular position of a mechanical shaft 14. The output energy of the Doppler frequency equipment 11 includes electrical alternations of nearly constant voltage, the frequency of which at any instant comprises the velocity data corrected for drift. This energy is transmitted by electrical conductors 16 to a square wave generator 17 which has a constant peak-to-peak output potential of 100 volts of rectangular wave form.

Figure 2:
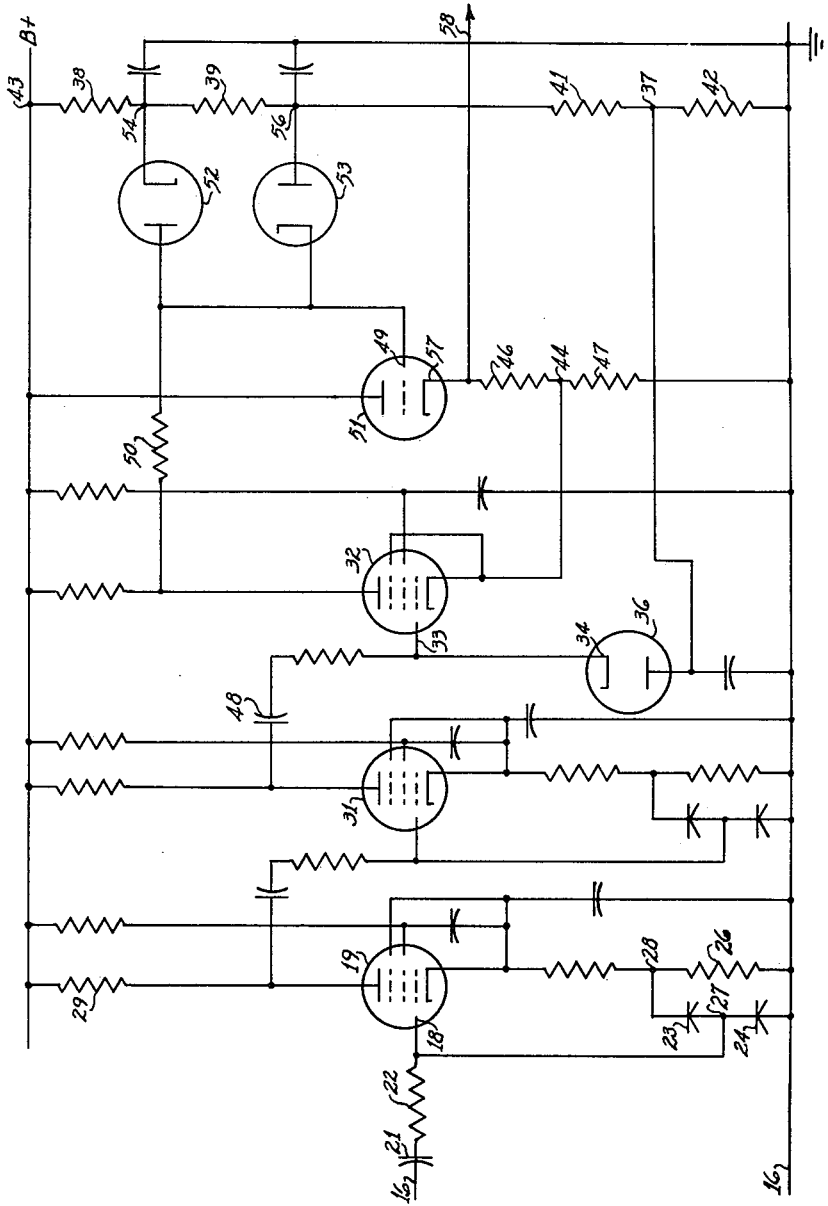
Fig. 2 is a schematic wiring diagram of a square wave generator used in the system of Fig. 1.

The circuit of the square wave generator 17 is illustrated schematically in Fig. 2. The input conductors 16 actuate the control grid 18 of a pentode discharge tube 19 through a blocking condenser 21. A high resistance 22 is interposed in series with the incoming energy to present a high impedance to the Doppler frequency equipment. Two germanium crystal rectifiers 23 and 24 bridged in series-aiding connection across a cathode resistor 26 are connected at their common terminal 27 to the control grid so as to limit the potential of the incoming signals. Potentials more negative than ground potential cannot exist because they would cause current flow through the rectifier 24 and potentials more positive than that of the cathode resistor terminal 28 cannot exist because they would discharge to that terminal. This limiter is provided in order to prevent large positive signals from developing grid current bias which would result in an unsymmetrical output wave form. The time constant of the plate resistor 29 in combination with distributed and internal capacitance is of such size that this stage has uniform response between 1 and 35 kilocycles. This also applies to the other stages of the amplifier.

The second stage comprising the pentode discharge tube 31 is resistance-coupled to the first stage and is similar to it.

The third stage comprising the pentode discharge tube 32 is resistance-coupled to the second stage, with the control grid 33 also connected to the cathode 34 of a clipping diode 36, the anode of which is connected to the 2½ volt point 37 of a potentiometer comprising four resistors 38, 39, 41 and 42 connected between a source of positive potential at the terminal 43 and ground. The purpose of this diode clipper 36 is to cut off large negative peaks at a definite voltage. The cathode of pentode 32 is returned to ground through the cathode resistance 47 and the grid condenser 48 has no leak resistance. As a result of the latter fact, the quantities of charge and discharge electricity flowing into this condenser must be equal so that equal areas are clipped from the tops and bottoms of any input wave larger than the potential between the level at which grid current is drawn by the tube 32 and the level at which the diode 36 conducts. Therefore, the anode wave form will be symmetrical about a predetermined anode voltage, and the cathode resistor 47 is made of such size as to control the grid bias so that the anode voltage will be normally at 125 volts.

The output of this stage is taken from the anode through a resistor 50 to the control grid 49 of a cathode follower tube 51. The control grid 49 is also connected through two limiting diodes 52 and 53 to two potential points 54 and 56 which are about 50 volts above and below the normal plate potential of the tube 32. To provide additional gain the cathode connection to ground of the tube 32 is made by connection to the terminal 44 intermediate of the cathode resistors 46 and 47 of the cathode follower stage, resulting in positive feedback from the follower 51 to the pentode 32. The output of the fourth stage tube 51 is taken from its cathode 57 through conductor 58.

It will be noted that both the tops and bottoms of potential waves are symmetrically clipped in the grid circuit of each of the four stages, so that this amplifier not only amplifies but also limits and squares the input wave potential, producing a practically perfectly rectangular output wave form of a definite peak-to-peak potential which is a constant fraction of the B supply potential.

The square wave generator output frequency carried by the conductor 58, Figs. 1 and 2, constitutes one of the input data to each of two resolvers 60 and 65, Fig. 1, and the mechanical shaft angular rotation or position represented in Fig. 1 by the dashed line 14 represents the other input to each resolver. Each resolver multiplies the frequency by the sine (or cosine) of the angle of the mechanical shaft.

The resolver 60 and the resolver 65 are identical except that the mechanical shaft 14 is connected to them relatively displaced by 90°, so that one multiplies by the sine of the shaft angle while the other multiplies by the cosine of the same angle. With this difference a description of one applies to the other. Such a description is given in the copending application Serial No. 62,947 of John W. Gray, filed on December 1, 1948, now Patent No. 2,696,946 so that unnecessary detail is omitted here.

Figure 3:
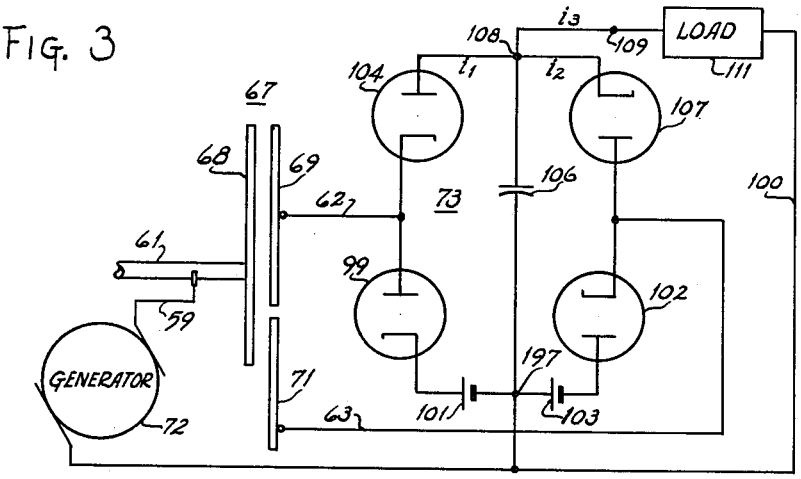
Fig. 3 is a schematic wiring diagram of the resolver used in the system of Fig. 1.

Briefly, each resolver consists of a differential sine condenser 67 and a four-diode bridge 73 as schematically illustrated in Fig. 3. The air-dielectric electrostatic condenser 67 has a single set of rotor plates 68 but has two sets of stator plates 69 and 71 so arranged that as the rotor enters one stationary set it leaves the other set. The shape of the rotor is carefully calculated so that the difference of the two capacitances formed by the rotor with the two stator sets is at all times proportional to the sine (or cosine) of the rotor shaft angular position. The rotor shape as determined by this calculation is nearly ellipitical, with its axis of rotation near one end of the shorter axis. Both sets of stator plates are semicircular in shape, and are much larger in area than the rotor to minimize edge effect.

The rotor 68 of the differential condenser is electrically fed from generator 72 through conductor 59, this generator representing the square wave generator 17 of Fig. 1. The rotor shaft 61 is mechanically connected to and positioned by a servomechanism, represented in Fig. 1 by rectangle 13, in accordance with the indications of a compass. The two stator plate sets 69 and 71 are connected electrically to a bridge composed of four diode discharge tubes. This bridge has two opposite arms connected through conductors 62 and 63 to the differential condenser stators while the two remaining arms serve as output connections through conductors 108 and 109 to a load 111. The conductor 100 is also connected to the return terminal of the generator 72.

In operation, the generator 72 charges the rotor 68 alternately positively and negatively, and induced charges are produced on the stator plates 69 and 71. The positive charges on the plates 69 will flow to ground through the diode 99 if more positive than the bias battery 101 interposed between that diode and ground, and all negative charges on the plates 71 will similarly flow to ground through the diode 102 when they are more negative than the bias battery 103, these batteries acting to cause operation of the diodes over preferred portions of their characteristic curves. But charges of opposite polarity take other paths, negative charges flowing from plates 69 through diode 104 into condenser 106 and positive charges flowing from plates 71 through diode 107 into the same condenser. In general, these charges will be different, since they come from stator plates having in general different areas opposed to the rotor plates. The charge flowing into condenser 106 will then be different from the charge flowing out per cycle and the total net charge per second will, of course, be the current flowing into or out of the condenser, and at constant voltage input this current will be proportional at any setting of the condenser to the frequency. In general it will be proportional to the sine (or cosine) of the condenser shaft setting angle times the frequency.

The above statement implies that the potential of the condenser 106 is kept constant. This is done by supplying, through conductor 109, in an automatic manner to be described, a current $i_3$ exactly equal to the difference of the currents $i_1$ and $i_2$ so that the charge on the condenser 106 actually does not change.

The load 111, from the standpoint of the resolver, may be of any type that can supply a current such as $i_3$ and indicate its magnitude and its time integral, while not requiring any power to be supplied to it through conductor 109. In this example the load consists of an integrator to be described hereinafter which satisfies these conditions.

In application of the resolver to the instant invention, with a signal of a frequency $f$ proportional to speed of the airplane and condenser angle $\theta$ representative of the ground course azimuth angle, the current $i_3$ will be representative of the component of speed in an east-west direction if the condenser is a sine resolver, and will be representative of the component of speed in a north-south direction if the condenser is a cosine resolver. The integral of the current $i_3$ in each case will, of course, be the total distance traveled in the east-west and north-south directions respectively.

The integrators 112 and 113 of Fig. 1 are identical except for the introduction to integrator 112 of latitude correction input data represented by the line 114, in a manner to be described hereinafter. Their other and primary input data are received from the resolvers 60 and 65. The explanation of the operation of the integrators with these data inputs can be made most clearly by considering the input energies as varying voltages. Such voltage variations, even in minute in magnitude, will, in practical operation, occur in Fig. 3 at the junction 108 as accompaniments of all variations of the differential current $i_3$.

Figure 4:
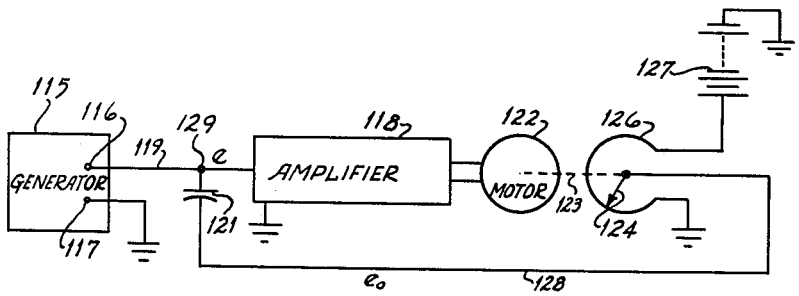
Figs. 4 and 6 illustrate schematically the principles involved in performing the integrating operation.

These voltage variations are represented in Fig. 4 as caused by variations in the output of a current generator represented schematically by a rectangle 115 having terminals 116 and 117. These terminals are connected to the input of an extremely high gain amplifier 118 through conductor 119. A motor 122 is connected in the output circuit of the amplifier 118, and is operated in one direction or the other at a speed of rotation which is governed by the output derived from the amplifier. The shaft 123 of the motor 122 is connected to operate the rotatable contact 124 of a potentiometer 126 connected to a source of potential 127 so that the potential of the moving contact at any instant of time is proportional to its position at that instant and its rate of change of potential varies as its speed of traverse over the potentiometer and hence the speed of the motor 122. This movable contact 124 is connected through a conductor 128 to the condenser 121 thereby forming the main negative feedback loop of the system.

In explaining the operation of the system of Fig. 4 and the manner in which an integration of the input current is obtained, certain assumptions will be made for the present, leaving to further description the exact apparatus used and the manner in which it functions to support these assumptions.

It is assumed for example, that the amplifier 118 has such an extremely high gain over its range of operation that the voltage at its input, namely, the voltage $e$ at terminal 129, is held substantially at zero relative to ground by the feedback action of the loop consisting of the motor 122, potentiometer 126, contact 124, conductor 128 and condenser 121 despite a wide variation in input to the system and output of the amplifier. Under such an assumption the current $i$ flowing through conductor 119 at any instant of time will have a value equal to the current $i_3$ flowing in the load 111 in Fig. 3.

It is likewise assumed that the amplifier 118 has a grid input which takes no appreciable current so that the current $i$ flows only into condenser 121. The potential across the condenser, therefore, changes at a rate equal to $$\frac{i}{C}$$

where C is the capacity of the condenser 121.

Under the assumptions made above, however, the potential $e$ at the input of the amplifier 118 must be maintained constant and therefore the feedback potential $e_0$ obtained from the movable contact on the potentiometer must change at an equal rate but in the opposite direction, that is $$\frac{de_0}{dt}=\frac{-i}{C} \qquad (1)$$

Inasmuch as the rate of change of $e_0$, i. e., $$\frac{de_0}{dt}$$

is produced by the rate of movement of the potentiometer contact, whenever $$\frac{de_0}{dt}$$

becomes unequal to $$\frac{-i}{C}$$

the potential $e$ of the terminal 129 will start to change. If for example, the tendency for $e$ to change is in the positive direction an increased output is obtained from the amplifier which causes the motor and hence potentiometer to increase in speed of rotation thus increasing the rate of change of the potential fed back to the condenser to restore the balance and maintaining the input potential $e$ at zero. Conversely, a tendency for the potential $e$ to change in negative direction results in a reduced amplifier output and a reduction in speed of rotation of the motor 122 and potentiometer contact 124 again restoring balance.

The change in potential obtained from the varying position of the contact 124 of the potentiometer depends on the speed of rotation thereof or change in angular position with respect to the ratio of total potential impressed across the potentiometer and the total potentiometer angle, that is:

$$\frac{de_0}{dt}=\frac{d\theta}{dt}\frac{V}{e_t} \qquad (2)$$

where $\theta$ is the angle assumed by the movable contact, $\theta_t$ is the total potentiometer angle and V is the potential impressed across the potentiometer.

Substituting the values given in Equation 1 and transposing there is obtained the equation $$\frac{d\theta}{dt}=\frac{\theta_t}{V}\frac{i}{C} \qquad (3)$$

If V is kept constant as is initially assumed, the total rotation $\theta$ is given by the expression $$\theta=\frac{\theta_t}{VC}\int i dt \qquad (4)$$

hence the total rotation over any selected interval of time is directly proportional to the integral of the current applied to the system over that interval of time and the direction of rotation is in one direction such that the feedback potential $e_0$ is decreasing when the applied current $i$ is positive and is in the opposite direction such that the feedback potential $e_0$ is increasing when $i$ is negative. If the input current becomes zero the output rotation stops wherever it may be.

The current $i$ must flow into the condenser 121 tending to produce a potential thereacross at a rate proportional to the current flowing therein because the capacity of the condenser C is kept constant. However, since the input potential $e$ of the amplifier must be maintained at zero for all practical purposes, there must be a negative feedback of a potential which at all times is equal and opposite to the potential change that is tended to be created by the current $i$ flowing into the condenser 121 and hence the rate of change of this feedback potential must at all times be equal and opposite to the instantaneous input current $i$. The rate of change of this fed back potential, however, is governed by the speed at which the potentiometer contact 124 traverses the potentiometer 126 and hence is proportional to the speed of rotation of the shaft 123 so that at any instant of time the shaft 123 is rotating at a speed and in a sense directly proportional to the value of the input potential $e$ and the amount of rotation over an interval of time will constitute a summation or the integral of the various instantaneous speeds and hence the integral of the input potential.

Figure 5:
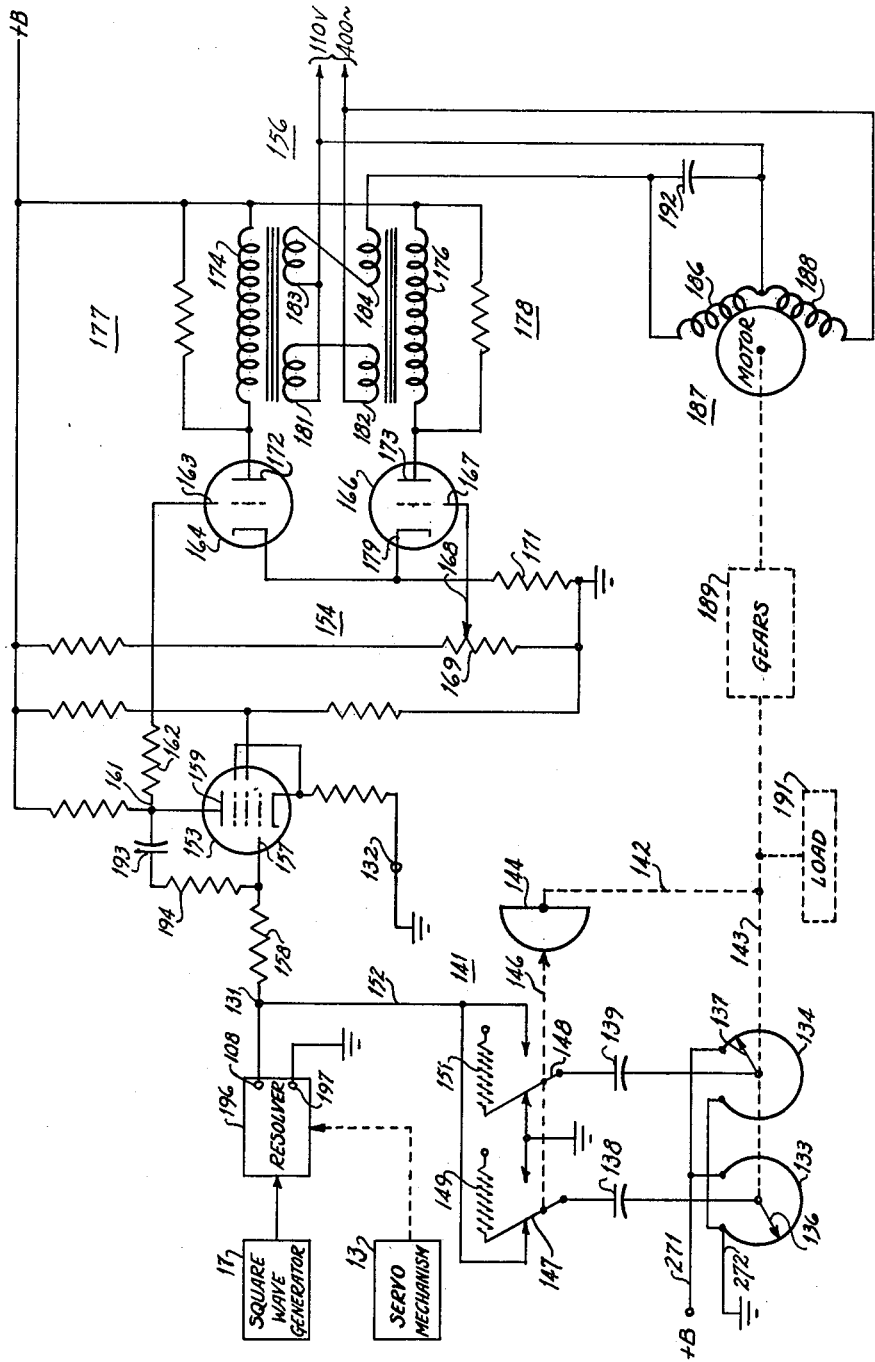
Figs. 5 and 7 are schematic wiring diagrams of integrator used in the system of Fig. 1.

For performing these integrating functions the instant invention contemplates the use of a device such as illustrated in some detail in Fig. 5 although other integrators may be used instead, such as that disclosed in copending application Serial No. 51,610 of John W. Gray, filed on September 28, 1948.

The current which is to be integrated is applied at the input terminal 131 of the system. It will be obvious that if integration is to proceed indefinitely there must be a continuous rotation of the potentiometer. A single potentiometer, however, must have some gap between its terminals and it is preferable that the sudden voltage changes which are caused by the contact in its journey across the gap from one end of the potentiometer should not be impressed on the system.

To this end in the preferred arrangement of Fig. 5 two potentiometers 133 and 134 have movable contacts 136 and 137 so positioned that they are displaced on their respective potentiometers approximately 180° from each other. Each of the respective contacts 136 and 137 is connected to a respective one of the condensers 138 and 139 and a two-pole double-throw switch 141 is so arranged that only the condenser and the movable contact which is not approaching its respective gap are connected in the circuit.

As illustrated in the circuit of Fig. 5 the shaft 142 connected to the shaft 143 which drives the movable contacts 136 and 137 is provided with a cam 144. The cam 144 in turn abuts against a rod or shaft 146 to which the switch blades or armatures 147 and 148 are connected. The armatures 147 and 148 are biased in one direction by the springs 149 and 151 so that unless urged in a direction to make contact with the left-hand switch contacts by the shaft 146 and cam 144, the springs cause engagement with the right-hand switch contacts. For approximately half a revolution of the movable contacts 136 and 137 the left-hand switch contacts are engaged through the action of the cam 144 and rod 146 while during the remaining half revolution the armatures 147 and 148 are urged against the right-hand contacts by the springs 149 and 151.

Assuming that the armatures are in the position of engagement shown, the potentiometer 133 and condenser 138 are connected in the feedback loop circuit while the upper plate of condenser 139 is grounded. Some time before the movable contact 136 reaches the open space of the potentiometer 133, the cam 144 has revolved to such an extent that the armatures 147 and 148 are allowed to be moved to their right-hand position under the action of springs 149 and 151. This movement causes the potentiometer 134 and condenser 139 to be connected in the feedback loop and the upper plate of condenser 138 to be connected to ground. Since just prior to this switching action the condenser which is next to be connected in the circuit has its terminal remote from that connected to the movable contact of its respective potentiometer grounded, the potential impressed across the condenser is equal to the potential impressed thereon at the time of switching so that adverse transient effects are in large measure avoided.

It will be readily appreciated that equivalent devices may be utilized in place of the exact switching arrangement shown. For example, a commutator may be used or the switches may be actuated by relays which are energized at appropriate intervals rather than by the purely mechanical arrangement of a cam and springs as shown. Likewise, it is not necessary that two entirely separate potentiometers be used although such an arrangement is shown for clarity. The same purposes may be served by a single potentiometer having two separate movable contacts displaced at an angle to each other. Nor is the time of switching critical, it being essential only that the switch be operated so that neither of the movable contacts is connected in the feedback circuit when at the open space of the potentiometer or potentiometers.

In Fig. 5 the square wave generator 17 and the servo-mechanism 13 represent the like-numbered devices of Fig. 1, and the resolver 196 represents either of the resolvers 60 or 65 of Fig. 1. The resolver output terminals 108 and 197 represent the like-numbered output terminals of the diode bridge shown in Fig. 3, so that the terminal 108 and the input terminal 131 represent the feedback terminals 108 and 109 of Fig. 3 either of which may be regarded as the junction of which the potential is kept constant by the current feedback action.

The input terminals 131 and 132 together with the conductor 152 which negatively feeds back energy to the terminal 131 in such sense as to maintain it very nearly at a fixed potential are connected to the input terminals of a very high gain amplifier consisting of a pentode discharge tube 153 in cascade with a differential discharge tube amplifier 154 and a saturable core magnetic amplifier 156. The terminal 131 is connected to the control grid 157 of the pentode 153 through a resistor 158 which forms part of an auxiliary feedback or memory circuit whose operation will be described hereinafter.

As stated above, it is one of the basic theoretical requirements of the instant invention that the deviation from zero of the potential at the grid of tube 153 shall be negligible as compared with the available range of input potentials at the terminal 131. This requirement is attained by the employment of a high gain pentode direct current amplifier stage at this point.

The output connection of the pentode 153 is taken from its plate 159 through a connector 161 to resistor 162 to the grid 163 of a triode 164, which forms part of a cathode-coupled differential amplifier stage. The remainder of this stage comprises another triode 166 with its cathode 179 connected to that of triode 164 and the grid 167 connected to an adjustable potential of approximately one-third of the B supply potential through the slider 168 of a potentiometer 169 which is in turn connected between the B supply and ground. The function of the potentiometer 169 is to permit no-signal adjustment of the differential output of the triodes 164 and 166 so that their plate currents are equal. The cathodes of the tubes 164 and 166 are connected through a common cathode resistor 171 to ground. The plates 172 and 173 are connected to the B supply through direct current control windings 174 and 176 of two saturable transformers 177 and 178, to be described later.

Upon change of the direct current level at the grid of the pentode 153, a larger change of the direct current level at the grid 163 of the triode 164 ensues, resulting in a further amplified change of current in the circuit of plate 172. If, for instance, the grid 157 should increase slightly in potential, the grid 163 would decrease in potential and the plate circuit current would decrease. This causes the plate current of the conjugate tube 166 to increase by nearly the same amount because of cathode coupling. The current through the cathode resistor 171 decreases momentarily which reduces the potential of the cathode 179, causing the plate current of the tube 166 to increase until the current flow in the resistor 171 is returned nearly to its former value. Thus, any variation of current through the coil 174 is accompanied by a nearly equal and opposite variation of current through the coil 176. By making the resistor 171 large its potential drop is made large compared with the potential changes in the triode grid 163, minimizing the second-order error caused by single-ended feed.

The magnetic amplifier 156 consists of two similar saturable core transformers 177 and 178. Each has a direct current control winding 174 and 176 which is capable of saturating the magnetic core, a primary winding 181 and 182 and a secondary winding 183 and 184. The primary and secondary windings of each are magnetically coupled, and the control winding is so arranged as to magnetize the core without appreciable induction from the primary. Under these conditions, with equal current excitation of the two primary windings, the amount of voltage generated in each secondary winding is roughly inversely proportional to the degree of magnetization produced in its core by its control winding. When the core is highly magnetized by the control winding the secondary output voltage is at a minimum and when the core is not magnetized by the control winding the secondary voltage is at a maximum. The primary windings 181 and 182 are continuously connected in series to a 400-cycle, 110-volt source of electrical energy. The secondary windings are connected in series with each other but in opposed relation and are also connected in series with one field phase winding 186 of a two phase motor 187. This winding 186 is shunted by a condenser 192 of such size as to tune the combination to the 400-cycle supply frequency; in other words, the combination of the condenser 192 with the winding 182 has unity power factor, and the impedance presented by the combination to the transformer is purely resistive. The other field winding 188 of the motor 187 is highly inductive and is connected permanently across the same power source that supplies the primary windings of the magnetic amplifier 156. Under these conditions, when the two transformer control windings have equal currents flowing in them, equal voltages are induced in the secondary windings 183 and 184, and being connected in opposition no current flows in them or in the motor field 186. When, however, one of the control windings such as winding 174 has an increased current and the other control winding 176 a correspondingly decreased current, the output potential of the secondary winding 183 will be reduced and that of the winding 184 correspondingly increased, so that they no longer balance and the overbalancing potential of winding 184 will cause current flow in the motor winding 186 in a direction which is either in phase with the primary potential or 180° therefrom, depending on the polarity of connection of the transformer windings. This current will be at a phase angle of approximately 90° to the current flowing in the winding 188 because the branch including winding 186 is substantially purely resistive while the branch of the winding 188 is inductive, and therefore the two phase motor will rotate. If the transformer control conditions are reversed the direction of current flow in the winding 186 is reversed, resulting in a reversed direction of motor rotation.

The motor 187 drives the potentiometer shaft 143 through step-down gearing 189 and also drives a load 191, the nature of which will be described later. The degree of amplification between the resolver 196 and the motor 187 is made to be so high that a minute change of potential in either direction at the terminal 131 will cause the motor to run forward or backward at full speed.

To prevent errors of integration due to short time variations in the operation of the system such as potentiometer ripple, sudden speed changes of the motor, etc., an auxiliary negative feedback circuit is provided which in effect acts as a memory circuit, storing aberrations in correctness of feedback compensation of the potential at terminal 131 and reintroducing them into the system at the proper time so that the total rotation is the correct integral of the input despite the concurrence of any short time errors of operation.

This auxiliary negative feedback or memory circuit consists of a series circuit composed of the condenser 193, resistance 194 and resistance 158 connected in series between the anode 159 of the tube 153 and the terminal 131.

As a criterion for correct operation and integration it is required that the potential of the terminal 131 be maintained at zero or ground potential by the negative feedback operation of the integrating mechanism comprising the motor 187 and potentiometers 133 and 134. If this loop operates so that at all instants of time the potential of the terminal 131 is at such ground potential, the total rotation of the motor and the potentiometer contacts will be the exact integral of the input potential over the interval of time considered.

Suppose, however, that through some fortuitous circumstance such as an inaccurate speed change of the motor, an erroneous integrating action might result. Assume further, for the purposes of explanation, that this erroneous action is such as to cause the potential of terminal 131 to rise above ground. This increase in potential of the terminal 131 would also tend to increase the potential of the grid 157 of the input stage 153 but because of the consequent increase of plate current and consequent drop of potential at the plate 159, communicated through the condenser 193 and resistor 194 to the grid 157, the latter tends to remain at zero potential. The action produces a potential drop across the resistor 158 and hence a current therethrough which is proportional to the error deviation.

This current flows into the condenser 193 producing a potential thereacross proportional to the rate of flow of such current and hence the integral of the error deviation. In order that the grid 157 be held at zero potential, therefore, the potential of the anode 159 must decrease at a rate proportional to the error deviation.

When however, conditions become such that normal operation may be resumed, the potential of the anode 159 cannot return to its original value until all of the charge accumulated on the condenser 193 by the flow of current through the resistor 158 has returned through the resistor 158. Such a return flow of current will cause the potential of the terminal 131 to be reduced below the zero point by an amount and for a time which corresponds to the amount and time of previous accidental increase so that the potential of the terminal 131 averages zero and hence the integral of the current flowing from the resolver 196 must all eventually appear as a charge on condenser 138 or 139 whichever is in use at the time and hence the total integral will be correct in spite of short time errors.

For example, in a device of this nature which has been constructed, the potentiometer shaft may be held against rotation momentarily by hand and when released the speed of rotation is increased for a short interval, correcting for the error introduced by the temporary restraint of the operating mechanism. Thus temporary errors of integration are remembered and correction applied so that the total integral is accurate.

In place of the integrator of Fig. 5 which operates by the equalization of electrical currents flowing into the junction 131, and is energized by the minute voltage variations incident thereto, there may be employed an integrator which employs separate conductors to the input and the output terminals of the servomechanism. Such an integrator has the advantage of permitting easier elimination of second-order errors which in the embodiment of Fig. 5 may make difficult the attainment of the highest precision.

Figure 6:
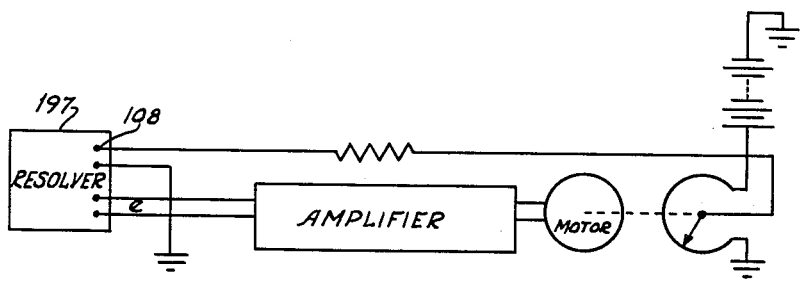

Fig. 6 illustrate the general principles of operation, in which an alternating potential is applied by the resolver 197 to the servo input terminals and a direct current is fed back through a different channel to the resolver terminal 108 to maintain the flow of current $i_3$, referred to in connection with Fig. 3.

Figure 7:
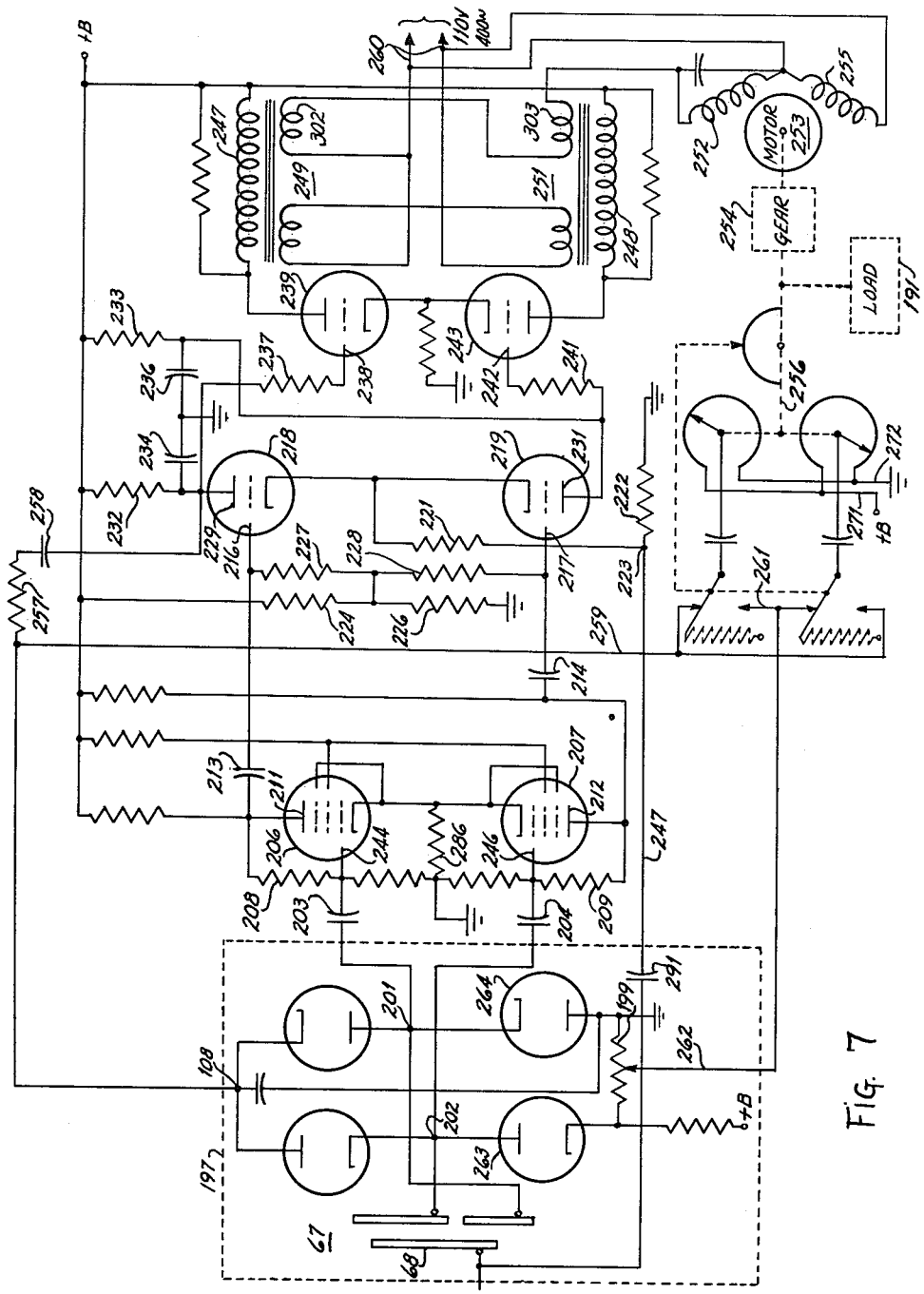

In Fig. 7 the resolver 197 is indicated in greater detail comprising the differential condenser and diode bridge of Fig. 3, but with the substitution of a potential drop through the resistor 199 for the two potential sources schematically represented by the characters 101 and 103 in Fig. 3. It also differs in that the output terminals of the resolver 197 in Fig. 7 are taken from the alternating current junctions 201 and 202, and the junction 108 is retained for its current feedback function only.

The electrical potentials which are impressed at the Doppler frequency and in phase on the junctions 201 and 202, and which are in proportion to the differential capacitance of the differential condenser 67, are fed through the blocking condensers 203 and 204 to the control grids 244 and 246 of two pentode discharge tubes 206 and 207 arranged as a differential amplifier stage. The resistors 208 and 209 are each connected between the plate and control grid of the respective tubes 206 and 207 to provide degenerative resistive feedback, compensating for the differing characteristics of the individual tubes although of like type and thus assuring reasonably similar operation conditions.

When the two parts of the differential condenser 68 have the same capacitance, the same square wave potential is impressed on both grids 244 and 246. This may be called the potential of the common mode and it is also the average of the potentials of the two grids at any other setting of the differential condenser. This common mode is amplified somewhat by the tubes 206 and 207 acting in unison but because the cathodes vary together and the grid biases do not vary, and because a large value of cathode resistor 286 is employed, the amount of amplification is small. The difference in the voltages impressed on the two grids 244 and 246 may be called the signal voltage and this difference is highly amplified in the tubes 206 and 207 in accordance with the usual equation for amplification because the two grid biases are forced to change with relation to each other, so that the amplification factor for the signal mode is about 100 times the magnitude of the amplification factor for the common mode.

For the purposes of explanation and also as found practically, the existence of the common mode in the plate conductors may be completely disregarded. The condensers 213 and 214 remove the direct current component from the signal voltage and the potentials with respect to ground impressed on the grids 216 and 217 of the triodes 218 and 219, therefore, are as represented graphically by the solid line 287 and dashed line 288 in Fig. 8, being opposed in phase and thus moving in opposite directions about the static grid bias point represented by the line 289. The curves 287 and 288 are made trapezoidal for clarity but they are actually rectangular.

Phase sensing is accomplished by introducing a common mode potential into the common circuit of the tubes 218 and 219. This potential is about 100 volts and is secured from the input or rotor plate 68 of the differential condenser 67. A large blocking condenser 291 is connected in the circuit to the cathodes and the potential impressed on its left plate is represented in Fig. 8 by line 292. The right side of the condenser 291 is connected to the junction 223 between the two common cathode resistors 221 and 222 of the tubes 218 and 219. The static grid bias network of these tubes consisting of the resistors 224, 227 and 228 are so designed as to impress a static potential of 25 volts on the grids 216 and 217. Therefore, if tubes having —5 volts bias at the static plate current permitted by the cathode resistors are used, the cathodes are at 30 volts. During the positive swing of the line 292 above 30 volts, the tube negative biases are drastically increased thereby and no plate current flows. But when the input potential indicated at 292 falls below +30 volts a potential drop is generated in the resistor 221, the cathode potentials are held near 30 volts as represented at 293, and the potential of the junction 223 falls to the vicinity of ground potential as represented at 295.

Fig. 9 illustrates the corresponding current magnitudes in the plate circuits of tubes 218 and 219. During half cycles such as that from times $t_0$ to $t_1$ both tubes are cut off and no current can flow in either. During remaining half cycles the grid 216 has a lower potential as represented by the line 287 and the bias of the tube 218 is therefore represented by the distance 294 between that line and the cathode line 293. The plate current corresponding to this bias is represented in Fig. 9 by the line 296. Similarly, the grid potential of the tube 219 represented by the line 288 is higher in the same half cycle so that the negative bias is less as represented by the distance 297. The plate current of the tube 219 is therefore larger as represented in Fig. 9 by the line 298.

The condensers 234 and 236 are utilized for the purpose of smoothing the potential drops in the plate resistors 232 and 233 due to these currents, supplying current to maintain the potential drops during the half cycles when no current flows through either tube. Consequently, the potentials at the plates 229 and 231 will remain nearly stationary throughout the cycle as indicated in Fig. 10. The line 299 represents the potential to ground of the plate 229 due to the current represented by the line 296, and the line 301 represents the potential to ground of plate 231 due to the current of line 298. These potentials are shown slightly serrated as the smoothing action is not theoretically perfect.

The difference between these potentials 299 and 301 and the sense of the difference represent accurately the magnitude and sense of the signal mode impressed on the grids 244 and 246 of the tubes 206 and 207.

The plates 229 and 231 of the triodes 218 and 219 are coupled through resistors 237 and 241 to the grids 238 and 242 of two triodes 239 and 243 constituting a direct current differential amplifier stage. The plates of this stage are connected to a positive source of potential through two coils 247 and 248 which constitute the control windings of two saturable core transformers, 249 and 251. The secondary windings 302 and 303 of these transformers are connected in series opposition to one field winding 252 of a two-phase motor 253, the remaining field winding 255 of which is connected to a source of electrical alternating power through conductors 260. The operation of this motor and transformers is the same as described in connection with Fig. 8 and so need not be here repeated.

The motor 253 is connected through a reduction gear 254 to a pair of potentiometers, the whole serving as an integrator in the feedback link of a servomechanism exactly as described in connection with Fig. 5, so that description of its operation here would be merely repetitious. A load 191 is connected to the shaft 256 operating the potentiometers.

The resistor 257 and condenser 258 are connected in series between the plate 229 of the tube 218 and the junction 108 to which the servo feedback is connected, constituting a memory circuit similar to that composed of the condenser 193 and resistors 194 and 158 in Fig. 5 and similarly connected. This circuit operates as before described hence further description is superfluous.

The current feedback from the integrator potentiometer switch contacts consists of the conductor 259 connected to the junction 108 of the diode bridge, exactly as in the circuit of Fig. 5 and the operation of this feedback to maintain a specific electrical condition at this junction is precisely the same in the two circuits, although the amplifier input in Fig. 5 is simultaneously taken from this junction while in Fig. 7 it is obtained from the alternating current terminals 201 and 202. Hence the feedback operation and the operation of the diode bridge are similar in the two cases.

In Fig. 7 the center contacts 261 of the potentiometer switch are returned to the slider 262 on the resistor 199, in order to secure a potential point intermediate of the bias potentials impressed by the resistance drop of the resistor 199 between the diodes 263 and 264. This secures a symmetry analogous to that in Fig. 3, necessary for accurate operation.

The load 191 on the two-phase servomechanism motor of both Figs. 5 and 7 has the function of counting the revolutions of the shaft to which it is connected and of displaying the count. The sum of these revolutions at any instant, or the count or dial reading is therefore the integral of the speed of the shaft. In terms of the use heretofore referred to, this reading is proportional to elapsed distance traveled by the airplane. If input data regarding the ground path is employed, the dial reading is the total ground distance traveled along the path followed; if input data derived from the east-west component of the path is employed, the dial reading is the elapsed east-west distance and if the north-south component is used the reading is the elapsed latitudinal distance. In addition the load may include tachometers connected to the same motor shafts to indicate present speeds in the east-west and north-south directions.

Returning to Fig. 1, a load or counter is indicated as a longitude display 266 and another as a latitude display 267. These dial displays may, of course, be easily designed as shown in Fig. 1 to read in degrees of latitude and longitude and to have mechanisms to set the counters manually to any desired initial reading. These set-back mechanisms are represented in Fig. 1 as the longitude initial setting knob 268 and latitude initial setting knob 269. It is contemplated in this example that at the start of a flight these dials will be set to the latitude and longitude of the point of departure; the readings at any instant during the flight will then constitute the actual present geographical location of the airplane in degrees of latitude and longitude. The rectangles 265 and 270 represent slip clutches to permit manual setting of the dial in spite of its shaft connection to the integrator.

Degrees of longitude vary in magnitude over the earth's surface from the equator to the poles, being proportional to the cosine of the latitude at any selected location. It, therefore, is necessary to correct the longitude display of Fig. 1 in accordance with the latitude. This is done by generating the cosine of the latitude in a generator 275 and using it as a multiplying factor for application to the output of the integrator 112. Fig. 11 represents a portion of an integrator as illustrated in both Figs. 5 and 7 and employs reference characters for the integrating potentiometers 133 and 134 identical with those in Fig. 5. This integrator is that depicted in Fig. 1 in the longitude data branch identified as integrator 112. In Figs. 5, 7 and 11 electrical power conductors 271 and 272 conduct direct voltage from a source to the terminals of the potentiometers 133 and 134, and in Fig. 11 the source is shown in greater detail as consisting of a cosine potentiometer 273 energized at its terminals by a direct current source 274. The cosine potentiometer output terminals 277 and 278 are connected to the integrating potentiometer terminal conductors 271 and 272, so that the potential on these conductors varies as the cosine of the angular position of the cosine potentiometer shaft 276. This shaft is driven, through a gear box 284 representing multiplication by a factor, by the latitude display counter 267. The potential available at the terminals 279—281 and 282—283 of the integrating potentiometers 133 and 134 is thereby varied in accordance with the cosine of the latitude in such a way that at latitude zero a degree of longitude has its maximum magnitude and at any other latitude the longitude degree is less and has its appropriate corrected value.

It will, of course, be appreciated that although the instant invention is applied to the solution of an airplane navigation problem it can also be applied to any other problem requiring the multiplication of one or two factors by the sine or cosine of another factor, with the integration of the product and the presentation of the resulting integral value as the angular displacement of a shaft.

In place of the sine condenser employed as an example there may be used a sine potentiometer or other device for securing the trigonometric function of any angle, without departing from the spirit of the invention.

What is claimed is:

1. A computer comprising, an electrical generator having an alternating output signal whose frequency is representative of first input data, a positioning mechanism having a mechanical output whose position is representative of second input data, a condenser having a rotor element and two stator elements positioned to be differentially charged by said rotor element, said rotor element having a configuration such that the difference in charge produced on said stator elements is a trigonometric function of the position of said rotor element, means for charging said condenser by said alternating output signal and means for positioning said rotor element in accordance with said mechanical output whereby the difference in charges produced on said stator elements is representative of the product of said first input data and a trigonometric function of said second input data, means for converting said charge to an electrical quantity and an integrator actuated by said electrical quantity having a mechanical output whose position is representative of the time integral of said electrical quantity.

2. A computer for use in connection with navigation systems wherein the frequency of an alternating current signal is representative of vehicle speed and a shaft rotational displacement is representative of vehicle direction of motion comprising, a first condenser having a rotor element and two stator elements positioned to be differentially charged by said rotor element said rotor element having a configuration such that the difference in charge produced on said stator elements is the sine of the angular position of said rotor element, means for charging said first condenser by said alternating current signal and means for positioning said rotor element in accordance with said shaft rotation whereby the difference in charges induced on said stator elements produces as an output an electrical quantity which is representative of the product of said signal frequency and the sine of the angular displacement of said shaft rotation, integrating means for producing a time integral of said electrical quantity, an indicator for indicating said time integral, a second condenser having a rotor element and two stator elements positioned to be differentially charged by said rotor element said rotor element having a configuration such that the difference in charge produced on said stator elements is the cosine of the position of said rotor element, means for charging said second condenser by said alternating current signal and means for positioning said rotor element in accordance with said shaft rotation whereby the difference in charges induced on said stator elements produces as an output a second electrical quantity which is representative of the product of said signal frequency and the cosine of the angular displacement of said shaft rotation, second integrating means for producing a time integral of said second electrical quantity and a second indicator for indicating said second-mentioned time integral.

3. A computer for use in connection with navigation systems wherein the frequency of an alternating current signal is representative of vehicle speed and a shaft rotational displacement is representative of vehicle direction of motion comprising, a first condenser having a rotor element and two stator elements positioned to be differentially charged by said rotor element said rotor element having a configuration such that the difference in charge produced on said stator elements is the sine of the angular position of said rotor element, means for charging said first condenser by said alternating current signal and means for positioning said rotor element in accordance with said shaft rotation whereby the difference in charges induced on said stator elements produces as an output an electrical quantity which is representative of the product of said signal frequency and the sine of the angular displacement of said shaft rotation, integrating means for producing a time integral of said electrical quantity, an indicator for indicating said time integral, a second condenser having a rotor element and two stator elements positioned to be differentially charged by said rotor elemen said rotor element having a configuration such that the difference in charge produced on said stator elements is the cosine of the position of said rotor element, means for charging said second condenser by said alternating current signal and means for positioning said rotor element in accordance with said shaft rotation whereby the difference in charges induced on said stator elements produces as an output a second electrical quantity which is representative of the product of said signal frequency and the cosine of the angular displacement of said shaft rotation, second integrating means for producing a time integral of said second electrical quantity, a second indicator for indicating said second-mentioned time integral, and cosine correction means for introducing into the first-mentioned integrating means a multiplying factor proportional to the cosine of the displacement of said second indicator.

4. A computer comprising, an electrical generator having a square wave form of alternating output signal whose frequency is representative of first input data, a positioning mechanism having a mechanical output whose position is representative of second input data, a condenser having a rotor element and two stator elements positioned to be differentially charged by said rotor element said rotor element having a configuration such that the difference in charge produced on said stator elements is a trigonometric function of the position of said rotor element, means for charging said condenser by said alternating output signal and means for positioning said rotor element in accordance with said mechanical output whereby the difference in charges produced on said stator elements is representative of the product of said first input data and a trigonometric function of said second input data, means for converting said charge to an electrical quantity and an integrator actuated by said electrical quantity having a mechanical output whose position is representative of the time integral of said electrical quantity.

5. A computer for use in connection with navigation systems wherein the frequency of an alternating current signal is representative of vehicle speed and a shaft rotational displacement is representative of vehicle direction of motion comprising, square wave generator means for converting said alternating current signal to a square wave form of constant peak to peak amplitude, a first condenser having a rotor element and two stator elements positioned to be differentially charged by said rotor element said rotor element having a configuration such that the difference in charge produced on said stator elements is the sine of the angular position of said rotor element, means for charging said first condenser by said square wave form signal and means for positioning said rotor element in accordance with said shaft rotational displacement whereby the difference in charges induced on said stator elements produces as an output an electrical quantity which is representative of the product of said signal frequency and the sine of the shaft angular displacement, integrating means for producing a time integral of said electrical quantity, an indicator for indicating said time integral, a second condenser having a rotor element and two stator elements positioned to be differentially charged by said rotor element said rotor element having a configuration such that the difference in charge produced on said stator elements is the cosine of the angular position of said rotor element, means for charging said second condenser by said square wave form signal and means for positioning said rotor element in accordance with said shaft rotational displacement whereby the difference in charges induced on said stator elements produces as an output a second electrical quantity which is representative of the product of said signal frequency and the cosine of the shaft angular displacement, second integrating means for producing a time integral of said second electrical quantity and a second indicator for indicating said second-mentioned time integral.

6. A computer for use in connection with navigation systems wherein the frequency of an alternating current signal is representative of vehicle speed and a shaft rotational displacement is representative of vehicle direction of motion comprising, square wave generator means for converting said alternating current signal to a square wave form of constant peak to peak amplitude, a first condenser having a rotor element and two stator elements positioned to be differentially charged by said rotor element said rotor element having a configuration such that the difference in charge produced on said stator elements is the sine of the angular position of said rotor element, means for charging said first condenser by said square wave form signal and means for positioning said rotor element in accordance with said shaft rotational displacement whereby the difference in charges induced on said stator elements produces as an output an electrical quantity which is representative of the product of said signal frequency and the sine of the shaft angular displacement, integrating means for producing a time integral of said electrical quantity, an indicator for indicating said time integral, a second condenser having a rotor element and two stator elements positioned to be differentially charged by said rotor element said rotor element having a configuration such that the difference in charge produced on said stator elements is the cosine of the angular position of said rotor element, means for charging said second condenser by said square wave form signal and means for positioning said rotor element in accordance with said shaft rotational displacement whereby the difference in charges induced on said stator elements produces as an output a second electrical quantity which is representative of the product of said signal frequency and the cosine of the shaft angular displacement, second integrating means for producing a time integral of said second electrical quantity, a second indicator for indicating said second-mentioned time integral, and cosine correction means for introducing into the first-mentioned integrating means a multiplying factor proportional to the cosine of the displacement of said second indicator.

References Cited in the file of this patent

UNITED STATES PATENTS

| | | |
|---|---|---|
| 2,402,025 | Crooke | June 11, 1946 |
| 2,403,542 | Newell | July 9, 1946 |
| 2,406,836 | Holden | Sept. 3, 1946 |
| 2,408,081 | Lovell | Sept. 24, 1946 |
| 2,432,504 | Boghosian | Dec. 16, 1947 |
| 2,434,274 | Lakatos | Jan. 13, 1948 |

OTHER REFERENCES

"A Sensitive Direct Current Electrical Integrator," R. W. Gilbert, The Review of Scientific Instruments, vol. 18, No. 5, May 1947, pages 328–331, incl.

"A Voltage Integrator," Anne Buzzell and Julian M. Sturtevant, The Review of Scientific Instruments, vol. 19, No. 10, October 1948, pages 688–692, incl.